E. S. Schnurr,
Clothes Sprinkler,

Nº 49,794.      Patented Sep. 5, 1865.

Witnesses;
Wm Freund
Theo Tusch

Inventor;
E. Schnurr
By Munn & Co
Att'ys

UNITED STATES PATENT OFFICE.

E. SCHNURR, OF MONROE, MICHIGAN.

CLOTHES-SPRINKLER.

Specification forming part of Letters Patent No. 49,794, dated September 5, 1865.

*To all whom it may concern:*

Be it known that I, E. SCHNURR, of Monroe, in the county of Monroe and State of Michigan, have invented a new and Improved Device for Sprinkling Water upon Clothes, &c.; and I do hereby declare that the following is a full, clear, and exact description thereof, which will enable others skilled in the art to make and use the same, reference being had to the accompanying drawings, forming part of this specification, in which—

Figure 1:
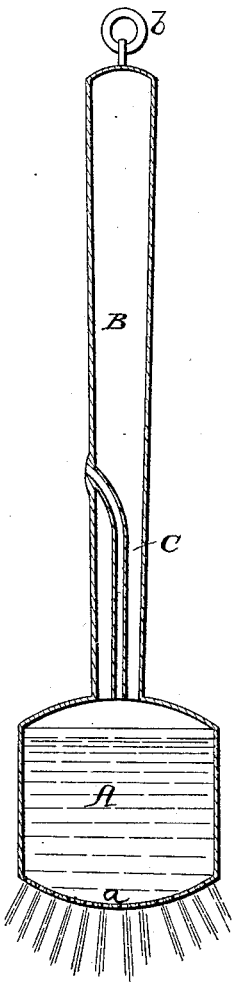
Figure 2:
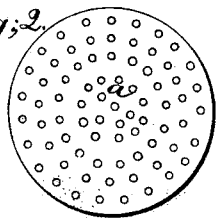

Figure 1 is a longitudinal section of my invention. Fig. 2 is a view of the face of the sprinkler.

Similar letters of reference indicate like parts.

Before ironing clothes that have been washed it is necessary to sprinkle them, so as to make them sufficiently damp to iron smoothly.

The object of my invention, therefore, is to provide a handy little device for effectually sprinkling the clothes; and it consists of a reservoir having a perforated face or bottom and a suitable handle attached thereto, and an air tube or duct communicating with the said reservoir and opening out on one side of the handle thereof, for admitting air when it is desired to use the sprinkler, as will be hereinafter described.

To enable others to understand my invention, I will proceed to describe it.

A represents the body of the reservoir, which is made of any desired shape. The bottom or face $a$ of this reservoir is finely perforated, as shown in Fig. 2, out of which the water can be readily shaken when air is properly admitted to the said reservoir.

B is the handle of the device, which is secured to the reservoir in any suitable way. It is provided at its upper end with a ring, $b$, by which to hang up the device.

C represents an air tube or duct leading from the reservoir A up the handle a suitable distance, to be easily reached by the thumb for closing it when desired, the said tube opening out at one side of the handle, as shown clearly in Fig. 1.

To fill this device when needed it is only necessary to immerse it in water, the air in the reservoir having a sufficient provision for escape as the reservoir fills with water.

This device will be found a very handy and convenient article, not only for sprinkling clothes, but for any other purpose when it is desired to deposit water in as fine particles as possible upon anything—as, for instance, sprinkling tobacco.

I claim as new and desire to secure by Letters Patent—

A device for sprinkling clothes, consisting of a reservoir, A, provided with a suitable air-duct, C, constructed substantially as herein shown and described.

ENHAD SCHNURR.

Witnesses:
JOHN P. SCHLUTER,
GEORGE M. LANDON.